May 22, 1962   H. C. A. RALPH ETAL   3,035,793
TOOTHED GEAR DRIVING MECHANISM FOR STEERING WHEELS
Filed Aug. 4, 1960   2 Sheets-Sheet 1
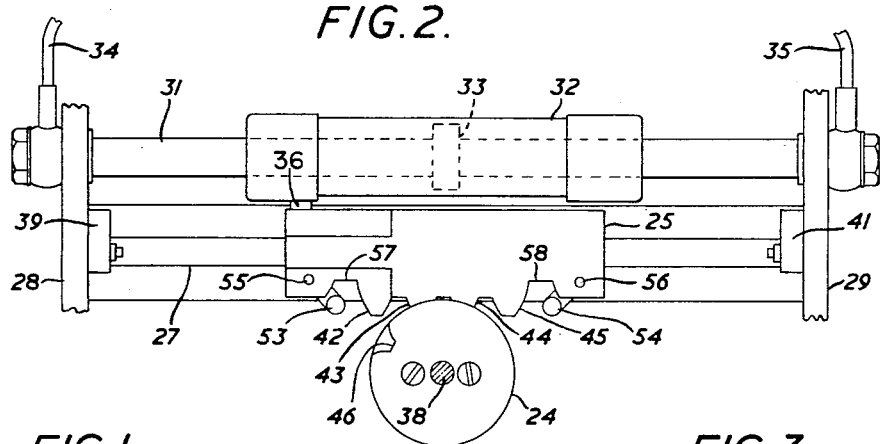
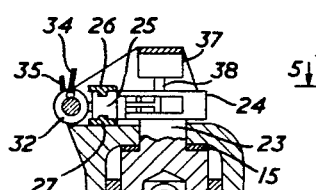
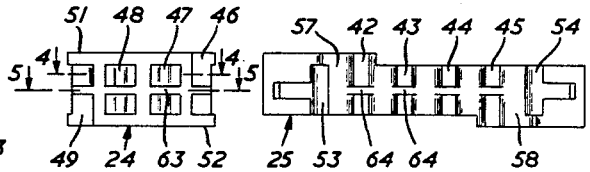
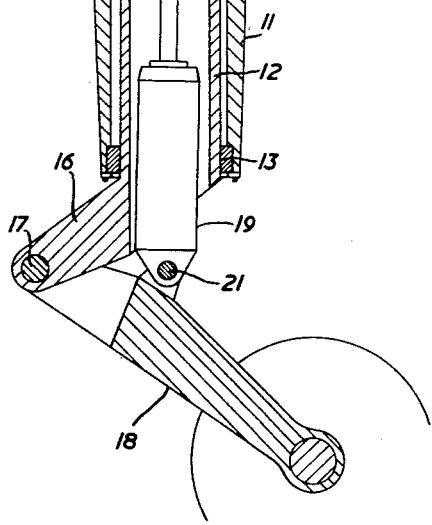
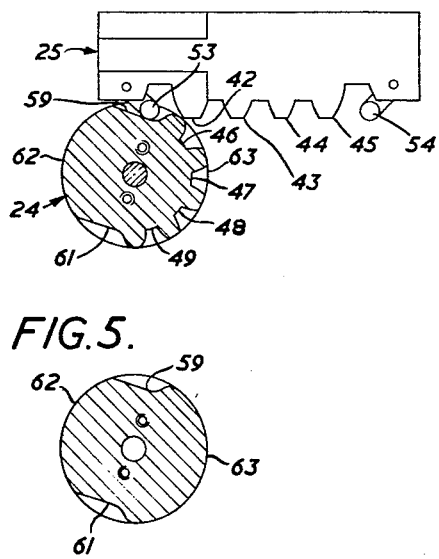
Inventors:
Harold C. A. Ralph and
Sidney W. H. Wood
Attorneys:
Reynolds + Christensen United States Patent Office 3,035,793
Patented May 22, 1962

3,035,793
TOOTHED GEAR DRIVING MECHANISM FOR STEERING WHEELS
Harold C. A. Ralph, 29 Collenswood Road, Bandley Hill, Stevenage, England, and Sidney W. H. Wood, 41 Cleevelands Ave., Cheltenham, England
Filed Aug. 4, 1960, Ser. No. 47,424
Claims priority, application Great Britain Aug. 4, 1959
4 Claims. (Cl. 244—50)

This invention relates to steering mechanism for an aircraft wheel mounting of the kind in which power steering is provided over a given range of steering angle on opposite sides of the central position, but in which free castering can take place not only within the given range but beyond it over a complete turn or more as occasion demands.

Rack and pinion steering mechanisms for land vehicles are generally known and they have the advantage of a substantially uniform torque drive.

The main object of the present invention is to provide rack and pinion steering mechanism adapted to an aircraft wheel mounting of the kind referred to, and a more specific object is to ensure correct meshing between the rack and pinion when the nosewheel mounting returns from free castering beyond the range of intermeshing of the rack and pinion.

According to the invention, steering mechanism for an aircraft wheel mounting comprises a pinion attached to a steerable member of the wheel mounting, a power-operated rack capable of meshing with the pinion and mounted in the fixed part of the wheel mounting for movement in a direction transverse to the steering axis of the wheel mounting, the rack having a range of transverse movement which enables it to pass out of meshing engagement with the pinion at opposite ends of the range during free castering movement of the wheel mounting, a number of gear teeth on the rack and a corresponding number of sockets in the pinion shaped to receive the rack teeth in meshing engagement therewith, each end tooth of the rack being engageable with the corresponding end socket in the pinion and none other, and spring means arranged to cause re-engagement of the rack teeth with the pinion sockets after free castering movement of the wheel mounting when the pinion turns towards meshing engagement with the rack.

The invention is illustrated by way of example in the accompanying drawings, of which:

FIGURE 1 is a longitudinal section of an aircraft nosewheel mounting incorporating rack and pinion steering mechanism in accordance with the invention;

FIGURE 2 is a plan view of the steering mechanism;

FIGURE 3 is a front elevation of the rack and pinion shown separated;

FIGURE 4 shows the rack and pinion at one end of the steering range, the pinion being sectioned on the line 4—4 of FIGURE 3;

FIGURE 5 is a section of the pinion on the line 5—5 of FIGURE 3; and

Figure 6:
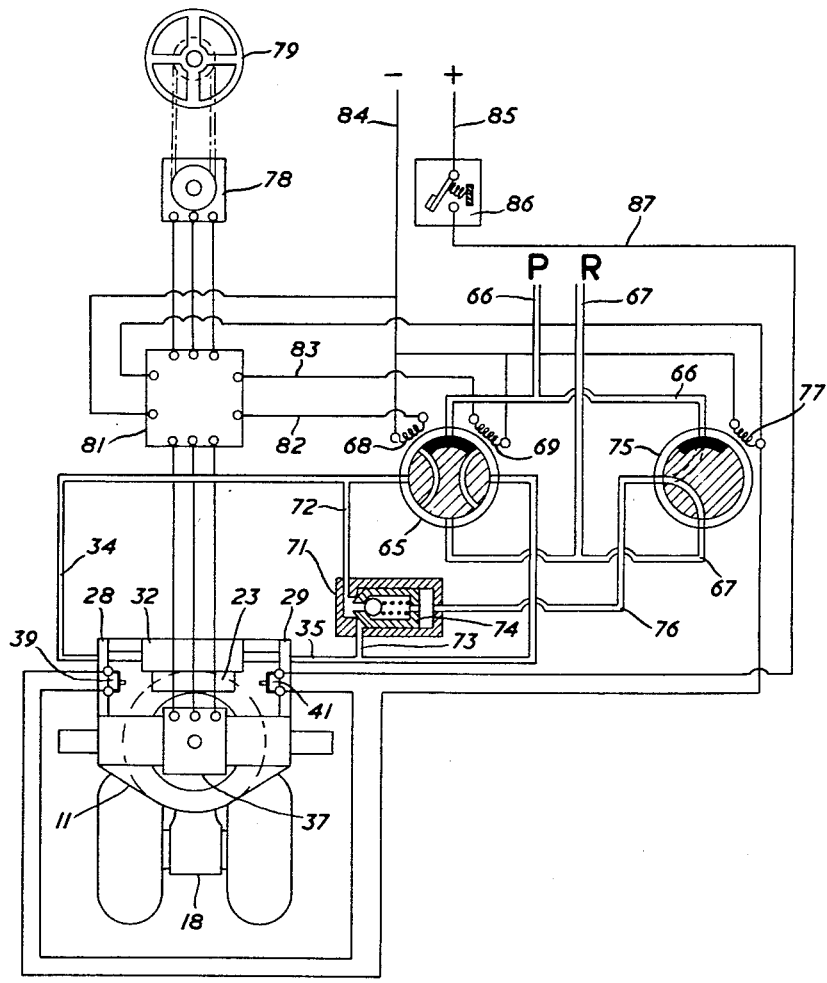
FIGURE 6 is a diagram of the steering system as a whole.

The invention is applicable to any form of wheel mounting in which power steering and free castering are required, but in this example is shown incorporated in a lever suspension type of nosewheel mounting. FIGURE 1 shows a leg housing 11 having a hollow steering member 12 supported rotatably by two journal bearings 13 and 14, and a thrust bearing 15. The steering member 12 has a lower offset arm 16 with a lever pivot 17 on which a wheel-carrying lever 18 is mounted. A resilient shock absorber 19 is interposed between a pivot 21 on the lever 18 and a pivot 22 in the upper part of the steering member 12. A reduced central portion 23 of the member 12 extends upwardly through the housing 11 and carries a pinion 24 which is engaged by a rack 25.

Referring also to FIGURE 2, the rack 25 is mounted to slide in transverse upper and lower guides 26 and 27 which extend between upstanding ears 28 and 29 at opposite sides of the housing 11. A piston rod 31 fixed at its ends in the ears 28 and 29, carries a steering jack cylinder 32 which is movable with respect to a piston 33 fixed in the middle of the piston rod 31. The piston rod 31 which is hollow from both ends, connects the cylinder 32 on opposite sides of the piston 33 with hydraulic supply pipes 34 and 35. A driving connection 36 extends between the jack cylinder 32 and the rack 25. An electrical follow-up unit 37, which will be later referred to, is fixed between the ears 28 and 29 and it includes a spindle 38 which is rotatable with the steering member 12. Limit switches 39 and 41, which will also be referred to, are mounted on the ears 28 and 29 for engagement by opposite ends of the rack 25.

The rack 25, see FIGURE 3, may have any suitable number of teeth but in this example is shown with four teeth 42, 43, 44 and 45 of which the tooth 42 at the left hand end is elongated upwardly to be co-terminous with the upper face of the pinion 24, while the tooth 45 at the right hand end is elongated downwardly to be co-terminous with the lower face of the pinion 24. The pinion 24, has corresponding sockets 46, 47, 48 and 49 to receive the rack teeth 42, 43, 44 and 45 respectively. The sockets are contained between circular end portions 51 and 52 of the pinion which are cut away with the profile of the sockets 46 and 49 respectively so that the elongated teeth 43 and 45 may mesh therewith. Spring-loaded pawls 53 and 54, each formed as a cylinder on the end of an arm which is inclined towards the pinion 24, are carried by pivots 55 and 56 in opposite ends of the rack 25. These pawls are spring-loaded outwardly to form in effect additional teeth at the ends of the rack which are retractable against spring load into slots 57 and 58 in the body of the rack 25.

The pinion 24 is formed on opposite sides with recesses 59 and 61, FIGURES 4 and 5, which are bounded by the circular end portions 51 and 52. Each recess terminates in the circumferential sense at the first or last tooth of the pinion 24 and tapers in the opposite direction towards the inoperative surface 62 of the pinion which is cylindrical between the recesses. Each pawl 53 or 54 is capable of entering the recesses 59 and 61 when the pinion fully rotates, but is prevented from entering the sockets 46, 47, 48 and 49 by a medial web 63, FIGURES 3 and 5, which extends between the teeth of the pinion but not into the recesses 59 and 61. The rack teeth 42, 43, 44 and 45 are traversed by medial slots 64 to accommodate the web 63.

The operation of the steering mechanism thus far described will now be given. The rack 25 under hydraulic pressure applied to one side or the other of the jack piston ton 33 will be traversed in its guides 26 and 27 and turn the pinion 24 clockwise or anti-clockwise under a substantially uniform torque. The range of angular movement from the central position thus imparted to the steering member 12 is determined by the limit of meshing engagement of the rack tooth 42 in the pinion socket 46, or the rack tooth 45 in the pinion socket 49.

If now it is desired to allow the nosewheel mounting to caster freely within and beyond the range of meshing engagement between the rack and pinion, both sides of the hydraulic steering jack 32, 33 are placed at low pressure whereby the rack 25 can be displaced on its guides 26 and 27 by the pinion 24 without appreciable resistance. If, for example, the pinion 24 turns in a clockwise direction a point is reached at which the pinion has displaced the rack 25 as far as it can to the right and passes out of mesh with the gear tooth 42. The pinion 24 can continue to turn with the circular end portion 51 sliding on the tooth 42 and the spring loaded pawl 53 riding out of the recess 59 on to the inoperative surface 62 of the pinion. Upon further turning movement the pawl 53 drops into the recess 61 but rides out again on to the medial web 63. It will thus be seen that unobstructed castering of the wheel mounting can take place through more than a complete turn.

If now the wheel mounting casters are in an anti-clockwise direction, the pinion 24 will return to the position of FIGURE 4 in which the pawl 53 drops into the recess 59. When the pinion tooth which is formed between the socket 46 and the recess 59 enters into engagement with the pawl 53, this pawl cannot retract as the engagement force has a line of action with an outward component. The pinion tooth referred to therefore acts through the pawl 53 to displace the rack 25 to the left as the pinion 24 turns so that the elongated rack tooth 42 enters the elongated socket 46 whereby the rack and pinion are correctly enmeshed.

The range of movement of the rack 25 in its guides 26 and 27 is limited by end stops such that when the rack 25 is up against either of these the tip of the tooth 42 or the tooth 45 is clear of the circular periphery of the pinion, but the pawls 53 and 54 can still enter the recesses 59 or 61 respectively to bring the rack and pinion into mesh as described.

If the pinion 24 turns in an anti-clockwise direction, castering of the nosewheel mounting and re-engagement of the rack and pinion will take place in the same manner as previously described because the rack and pinion are formed symmetrically on opposite sides of their centre lines though the arrangement is inverted on one side with respect to the other.

It is necessary that the hydraulic power to the jack 32, 33 should be automatically cut off before the rack and pinion pass out, or into, meshing engagement, otherwise it would be possible for the jack 32, 33 to cause either the tooth 42 or the tooth 45 to bear with considerable force against the circular periphery of the pinion 24 during castering action, thereby causing friction and tooth wear.

The manner in which power cut off is effected will be understood from a description of the steering system diagram of FIGURE 6. The liquid supply pipes 34 and 35 of the steering jack connect to opposite sides of an electro-magnetically controlled three position valve 65 which also has pressure and return pipes 66 and 67 connected thereto. Actuation of the valve solenoids 68 or 69 connects the pressure and return pipes reversably with the supply pipes 34 and 35. A by-pass valve 71 of known form is connected across the supply pipes 34 and 35 by branch pipes 72 and 73, and it includes a piston closure member 74 which closes the valve 71 when subject to pressure on its rear face. A two-position electro-magnetically controlled valve 75 to which the pressure and return pipes 66 and 67 are connected, is also connected by a pipe 76 with the rear face of the piston closure member 74. The valve 75 normally connects the return pipe 67 to the pipe 76 and piston 74, but it includes a solenoid 77 which is energized to connect the pressure pipe 66 to the pipe 76 and piston 74.

The steering is effected in this example by an electrical remote control system which includes an input unit 78 driven by the pilot's steering wheel 79, the follow-up unit 37 which is responsive to the steered angle of the nosewheel mounting, and a relay panel 81 which has wires 82 and 83 connected to solenoids 68 and 69. A negative supply lead 84 is connected to the relay panel 81 and the solenoids 68, 69 and 77. A positive supply lead 85 connects to a pilot's steering selector switch 86 from which a continuation lead 87 is connected in series through both limit switches 41 and 39 to the solenoid 77. The limit switches 41 and 39 are normally closed, but opened by contact with the rack 25 before the rack passes out of meshing engagement with the pinion 24.

The electrical remote control system is of a known kind in which an input signed from the unit 78 and a follow-up signed from the unit 37 are fed to the relay panel 81, and in which the difference of phase between the two signals causes one or other of the solenoids 68 or 69 to be energized. Corresponding operation of the valve 65 causes liquid flow to the jack cylinder 32 with effect to cancel out the phase difference between the steering angle selected by the handwheel 79 and the steered angle of the wheel mounting.

The solenoid 77 of the by-pass control valve 75 is energized all the time that the steering system is operational whereby the by-pass valve 71 is closed by the piston 74. The steering control valve 65 is of the blind neutral kind and the by-pass valve 71 when open enables liquid to flow freely from one side of the jack cylinder 32 to the other through the supply pipes 34 and 35, and the branch pipes 72 and 73.

When ground maneuvering the aircraft, the steering system will normally be operated well within its range of angular movement from the central position, and so long as the rack 25 does not contact either limit switch 39 or 41, the steering system will remain operational.

If the nosewheel mounting is required to caster freely, for example when maneuvering the aircraft with a tug vehicle, the steering selector switch 86 is opened with the result that the steering control valve 65 returns to blind neutral, and the by-pass control valve 75 returns to the full line position shown in FIGURE 6 in which the by-pass valve 71 is connected with the return pipe 67 and therefore open. If the nosewheel mounting casters beyond the steering range, one or other of the limit switches 39 or 41 is opened by contact with the rack 25 before it passes out of mesh with the pinion 24. If subsequently the pilot attempts to regain steering control by closing the selector switch 86, the system remains inoperative until the aircraft is moved with effect to caster the nosewheel mounting back within the steering range. The limit switch 39 or 41 which was open is now disengaged by the rack 25 and closed to complete the circuit to the solenoid 77 and relay panel 81, but not before the rack 25 has entered into mesh with the pinion.

While the spring loaded parts 53 and 54 are the preferred means for effecting meshing engagement between the rack 25 and pinion 24, it is possible to dispense with the pawls and provide instead springs at each end of the rack 25 which urge the rack inwardly towards its central position, whereby the rack 25 is moved towards centre by spring load when either elongated socket 46 or 49 turns towards centre into register with the corresponding elongated tooth 42 or 45.

We claim as our invention:

1. Steering mechanism for an aircraft wheel mounting having a fixed member and a steerable member mounted for a rotation therein, comprising a pinion connected to the steerable member for rotation therewith, said pinion having a number of sockets formed in part of its peripheral face of which each end socket extends axially beyond the intermediate sockets into a portion of said peripheral face which is circumferentially continuous except for the end socket extending therein, a rack having teeth meshing during steering with said pinion's sockets, said rack being mounted on the fixed member of the wheel mounting for linear movement in a direction transverse to but spaced from the rotational axis of the pinion, a power-operated actuator operable upon the rack to move the same linearly and thereby to turn the pinion in opposite directions within a given angular steering range, the number of teeth on the rack corresponding in number to the pinion's sockets and each projecting from the face of the rack which lies adjacent the pinion to enter the corresponding pinion sockets in meshing engagement upon displacement of the rack by said power-operated means, each end tooth of the rack being substantially co-extensive in the axial direction with the corresponding end socket of the pinion whereby the circumferentially continuous portion of the pinion into which said end socket extends is rotatable against said end tooth during rotation of the pinion beyond the steering range, and spring means operative upon the rack during reverse rotation of the pinion towards the steering range to displace the rack into meshing engagement of said end tooth of the rack with said end socket of the pinion.

2. Steering mechanism according to claim 1, wherein the spring means and end tooth at each end of the rack comprises a spring-loaded pawl mounted at the respective ends of the rack in a position spaced from the next adjacent end tooth of the rack, the pawl being retractable against spring load towards the body of the rack, and a recess in the periphery of the pinion beyond each end socket, said recess being adapted to receive the corresponding pawl therein and being shaped so that the pawl rides out of one end of the recess when the pinion turns away from meshing engagement but so that the pawl bears against the other end of the recess when the pinion turns in the opposite direction.

3. Steering mechanism according to claim 1, including limit devices controlling connection of said actuator with a power source, said limit devices being mounted for coaction with the rack and pinion mechanism at opposite ends of the steering range but within the limits of meshing engagement of the rack and pinion, and said limit devices including cut-off means operative upon coaction of said limit devices with the rack and pinion mechanism to disconnect said power source from said actuator and to reconnect said power source upon disengagement of said limit devices from said rack and pinion mechanism.

4. Steering and castering mechanism for a wheel mounting comprising a fixed member and a steerable member rotatably supported therein, a pinion connected to and rotative with the steerable member, a reciprocable rack cooperating with said pinion and carried by said fixed member for movement transversely of the axis of the pinion, an actuator so to move said rack to effect said steering throughout an angular range less than 360°, said rack having a number of fixed intermediate teeth and an additional movable tooth at each end spring-urged into position to engage the pinion, but yieldable to free the pinion for castering beyond the limits of such angular range, and said pinion having a series of intermediate sockets in its peripheral space corresponding in number to and receiving the respective intermediate teeth of the rack, and having also two end sockets each extending axially beyond the intermediate sockets into a portion of the pinion's peripheral surface which is circumferentially continuous except as such end sockets extend thereinto, each movable end tooth of the rack being substantially coextensive axially with said end sockets, and each end socket being sloped at one side to depress the corresponding spring-urged tooth for castering beyond the limit of the angular range, but shouldered at the opposite side to be operatively engaged by the spring-urged tooth for initiation of steering engagement, upon reverse rotation of the pinion and the connected steerable member.

References Cited in the file of this patent

UNITED STATES PATENTS

| | | |
|---|---|---|
| 2,492,649 | MacDuff | Dec. 27, 1949 |
| 2,756,949 | Smith | July 31, 1956 |

FOREIGN PATENTS

| | | |
|---|---|---|
| 637,983 | Great Britain | May 31, 1950 |